(12) United States Patent
Kulewski et al.

(10) Patent No.: US 10,380,447 B1
(45) Date of Patent: Aug. 13, 2019

(54) PROVIDING REGIONS OF INTEREST IN AN IMAGE

(71) Applicant: Google Inc., Mountain View, CA (US)

(72) Inventors: Krzysztof Kulewski, Sunnyvale, CA (US); Aravind Krishnaswamy, San Jose, CA (US); Sevket Derin Babacan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 106 days.

(21) Appl. No.: 14/555,120

(22) Filed: Nov. 26, 2014

(51) Int. Cl.
*G06K 9/00* (2006.01)
*G06K 9/20* (2006.01)
*G06K 9/46* (2006.01)

(52) U.S. Cl.
CPC ....... *G06K 9/2081* (2013.01); *G06K 9/00228* (2013.01); *G06K 9/4642* (2013.01)

(58) Field of Classification Search
None
See application file for complete search history.

(56) References Cited

U.S. PATENT DOCUMENTS

| | | | | |
|---|---|---|---|---|
| 6,999,624 B1* | 2/2006 | Nelson | | G06K 9/3241 382/103 |
| 7,460,693 B2* | 12/2008 | Loy | | G06K 9/00221 382/103 |
| 8,200,010 B1* | 6/2012 | Jing | | G06K 9/00751 382/164 |
| 8,432,492 B2* | 4/2013 | Deigmoeller | | G06K 9/00624 348/581 |
| 8,582,834 B2* | 11/2013 | Tong | | G11B 27/034 382/118 |
| 8,737,695 B2* | 5/2014 | Arguelles | | G06K 9/036 382/112 |
| 2008/0075336 A1* | 3/2008 | Luo | | G06K 9/00221 382/118 |
| 2009/0190857 A1* | 7/2009 | Epshtein | | G06T 3/0012 382/276 |
| 2013/0329999 A1* | 12/2013 | Imagawa | | G06K 9/40 382/167 |
| 2014/0314312 A1* | 10/2014 | Hashiguchi | | G06T 7/0081 382/164 |
| 2014/0314325 A1* | 10/2014 | Muninder | | G06T 3/4038 382/199 |
| 2015/0016693 A1* | 1/2015 | Gattuso | | H04N 5/23219 382/118 |
| 2015/0049910 A1* | 2/2015 | Ptucha | | G06F 17/30256 382/103 |
| 2016/0117798 A1* | 4/2016 | Lin | | G06T 3/40 345/667 |

FOREIGN PATENT DOCUMENTS

JP 2006031688 A * 2/2006
RU 2448367 C1 * 4/2012

* cited by examiner

*Primary Examiner* — Jiangeng Sun
(74) *Attorney, Agent, or Firm* — IP Spring (57) ABSTRACT

Implementations generally relate to providing regions of interest in an image. In some implementations, a method includes receiving an image. The method further includes determining one or more image features. The method further includes grouping the one or more image features into one or more regions of interest.

20 Claims, 5 Drawing Sheets

PROVIDING REGIONS OF INTEREST IN AN IMAGE

BACKGROUND

With the popularity and convenience of digital cameras, millions of photos are taken every day by people around the world. Many photos are taken with non-professional cameras including cell phones with camera features. When photos are taken in a rush, the resulting photos may have bad composition. Problems with composition can be fixed by properly cropping a photo to shift the focus to a particular object in the photo.

SUMMARY

Implementations generally relate to providing regions of interest in an image. In some implementations, a computer-implemented method includes receiving an image. The method further includes determining one or more image features. The method further includes grouping the one or more image features into one or more regions of interest.

With further regard to the method, in some implementations, the determining of the one or more image features includes detecting one or more faces. In some implementations, the determining of the one or more image features includes computing a wavelet transform. In some implementations, the determining of the one or more image features includes computing a Haar wavelet transform. In some implementations, the method further includes merging one or more regions of interest based on one or more predetermined merging criteria. In some implementations, each region of interest is a rectangle. In some implementations, the method further includes providing the regions of interest to a user, and enabling the user to select one or more regions of interest. In some implementations, the method further includes providing the regions of interest to a user, enabling the user to select one or more regions of interest, and providing the image to the user based on the selected regions of interest.

In some implementations, a non-transitory computer-readable storage medium carries program instructions thereon, where the instructions when executed by one or more processors cause the one or more processors to perform operations including: receiving an image, determining one or more image features, and grouping the one or more image features into one or more regions of interest.

With further regard to the computer-readable storage medium, in some implementations, to determine the one or more image features, the instructions further cause the one or more processors to perform operations including detecting one or more faces. In some implementations, to determine the one or more image features, the instructions further cause the one or more processors to perform operations including computing a wavelet transform. In some implementations, to determine the one or more image features, the instructions further cause the one or more processors to perform operations including computing a Haar wavelet transform. In some implementations, the instructions further cause the one or more processors to perform operations including merging one or more regions of interest based on one or more predetermined merging criteria. In some implementations, each region of interest is a rectangle. In some implementations, the instructions further cause the one or more processors to perform operations including: providing the regions of interest to a user, and enabling the user to select one or more regions of interest. In some implementations, the instructions further cause the one or more processors to perform operations including: providing the regions of interest to a user, enabling the user to select one or more regions of interest, and providing the image to the user based on the selected regions of interest.

In some implementations, a system includes one or more processors, and logic encoded in one or more tangible media for execution by the one or more processors. When executed, the logic is operable to perform operations including: receiving an image, determining one or more image features, and grouping the one or more image features into one or more regions of interest.

With further regard to the system, in some implementations, to determine the one or more image features, the logic when executed is further operable to perform operations including detecting one or more faces. In some implementations, to determine the one or more image features, the logic when executed is further operable to perform operations including computing a wavelet transform. In some implementations, to determine the one or more image features, the logic when executed is further operable to perform operations including computing a Haar wavelet transform.

DETAILED DESCRIPTION

Implementations described herein provide regions of interest in an image. In some implementations, a system receives an image. In some implementations, the image may be an image in a photo. In some implementations, the image may be an image in a video frame.

The system then determines one or more image features. In some implementations, the determining of the one or more image features includes detecting one or more faces. In some implementations, the determining of the one or more image features includes computing a wavelet transform. In some implementations, the determining of the one or more image features includes computing a Haar wavelet transform.

The system then groups the one or more image features into one or more regions of interest. In some implementations, the system merges one or more regions of interest based on one or more predetermined merging criteria. In some implementations, each region of interest is a rectangle. In some implementations, the system provides the regions of interest to a user, and enables the user to select one or more regions of interest. In some implementations, the system provides the modified image to the user based on the selected regions of interest.

Figure 1:
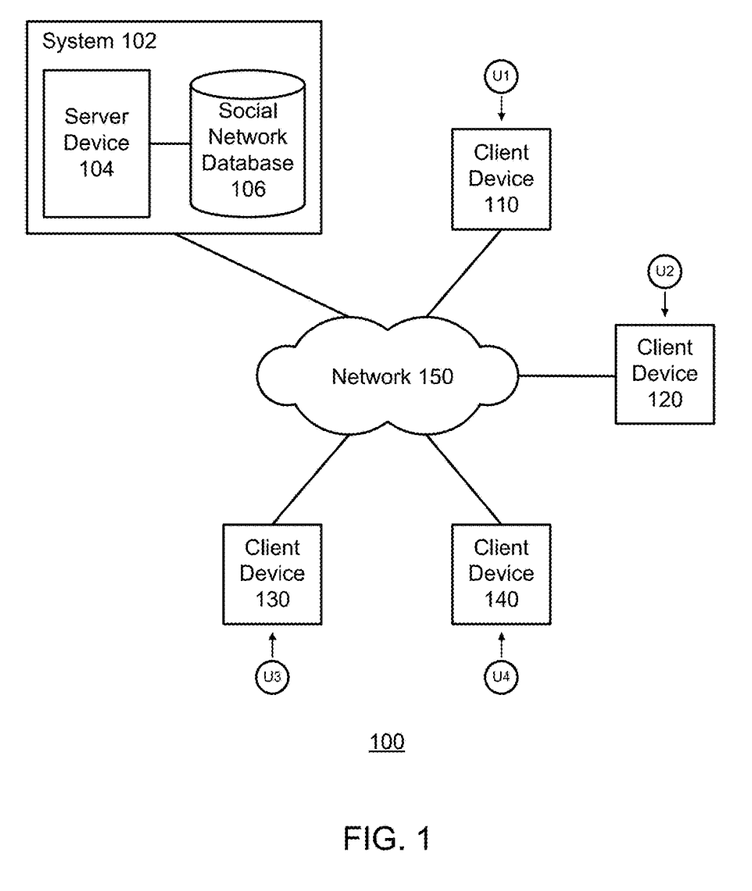
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other via respective client devices 110, 120, 130, and 140 transmit media items such as photos and videos to each other. Users may also interact with system 102 in order to transmit media items such as photos and videos to and from system 102.

In the various implementations described herein, the processor of system 102 causes the elements described herein (e.g., photos, videos, etc.) to be displayed in a user interface on one or more display screens.

In various implementations, system 102 may utilize a recognition algorithm to detect and recognize a face in one or more photos. Example implementations of recognition algorithms are described in more detail below.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
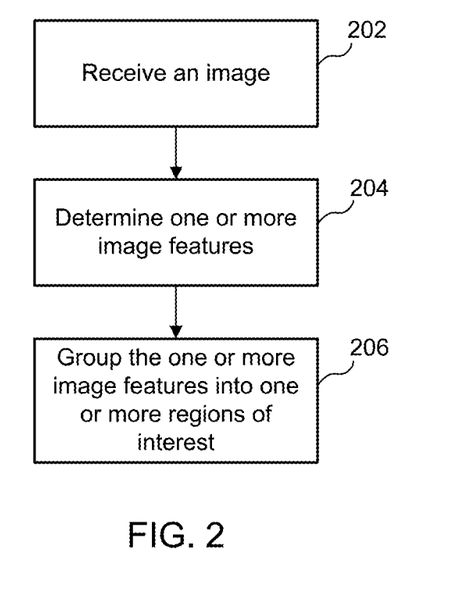
FIG. 2 illustrates an example simplified flow diagram for providing regions of interest in an image, according to some implementations.

FIG. 2 illustrates an example simplified flow diagram for providing regions of interest in an image, according to some implementations. Referring to both FIGS. 1 and 2, a method is initiated in block 202, where system 102 receives an image.

Note that various implementations are described herein in the context of a single image. Such implementations and others also apply to multiple images, depending on the particular implementations. Also, various implementations are described herein in the context of images in photos. Such implementations and others also apply to images in videos. For example, implementations may apply to one or more images, each image being a video frame.

In various implementations, system 102 receives photos from a user. In some implementations, the photos may be received when the user uploads the images to system 102 or after the user adds the images to one or more photo albums. In some implementations, system 102 may enable a camera device (e.g., smart phone) of the user to automatically upload images to system 102 as the camera device captures photos.

In block 204, system 102 determines one or more image features. In various implementations, to determine image features, system 102 preprocesses a given image. Such preprocessing includes system 102 extracting the image features.

In various implementations, to determine the one or more image features, system 102 detects one or more faces. In various implementations, system 102 may utilize a recognition algorithm to detect and recognize each face in the image. Example implementations of recognition algorithms are described in more detail below.

In various implementations, system 102 resizes the image. In some implementations, system 102 may utilize a bilinear resizer to fit the image into a box, where the box has predetermined sized dimensions (e.g., an 800×800 pixel box). This preserves the aspect ratio of the image. This also speeds-up computations. It will be appreciated that system 102 may use different image sizes for resizing. System 102 may also use various different resizing techniques (e.g., bicubic or nearest neighbor interpolation), depending on the particular implementation.

In various implementations, to determine the one or more image features, system 102 computes a wavelet transform for each image. System 102 may use the transform to generate an indication of content in an image. For example, in some implementations, system 102 may use the transform to generate an indication of one or more faces in the image. In some implementations, the transform can include performing an orthonormal wavelet transform such as the Haar wavelet transform. As such, in some implementations, the wavelet transform that system 102 may compute is a Haar wavelet transform. Various implementations directed to system 102 computing wavelet transforms are described in detail below.

In various implementations, system 102 can compute a wavelet transform at multiple levels (e.g., compute a two-level wavelet transform). For example, in some implementations, system 102 may compute a partial two-dimensional (2D) discrete Haar wavelet transform, applied twice in order to compute two levels of the transform.

In some implementations, system 102 may compute a discrete Haar wavelet transform for multiple image channels, such as for each color channel of an image (e.g., three channels in a Red, Green, Blue, or RGB scenario). In some implementations, the wavelet transform separates the image into three different boxes at each level, where each box corresponds to vertical, horizontal, and diagonal directions of filtering.

Alternatively, system 102 may compute the transform for a single color channel, computed for one or more channels not in the RGB color space. System 102 may convert the image to a single channel color space (e.g., grayscale) and compute the transform on the converted image.

It will also be appreciated that a different transform can be used (e.g., Gabor transform). In general, any transform that can provide an indication of content in an image, such as edges or changes can be used. Also, the Haar transform could be computed to a different number of levels than two.

Figure 3A:
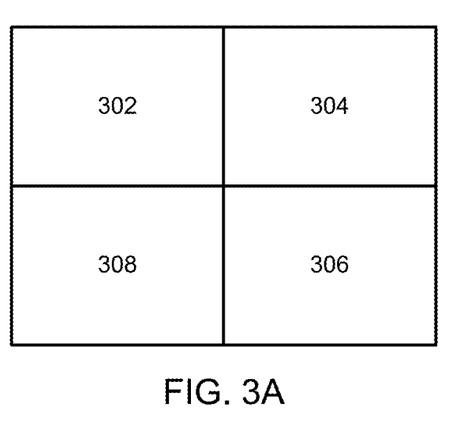
FIGS. 3A and 3B are diagrams of example Haar transform outputs, according to some implementations.
Figure 3B:
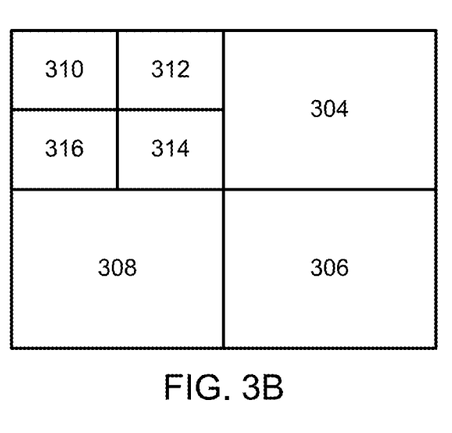

FIGS. 3A and 3B are diagrams of example Haar transform outputs, according to some implementations.

FIG. 3A illustrates an example first level Haar transform output, according to some implementations. A first level Haar transform output is shown diagrammatically by quadrants 302, 304, 306, and 308. After the second level Haar transform is performed, the output can resemble the diagram in FIG. 3B.

FIG. 3B illustrates an example second level Haar transform output, according to some implementations. As shown, the three boxes used for the histogram are 312, 314, and 316, correspond to horizontal, vertical, and diagonal directions of the transform, respectively. In some implementations, when generating the histogram, system 102 multiplies each value by a predetermined number (e.g., 10) and then takes the absolute value. In some implementations, system 102 truncates the absolute value to not exceed a predetermined number (e.g., 255). The histogram may take into account values from all three-color channels (e.g., in the case of RGB or other three-channel color space), so there are 3*Channels*Image Width (pixels)*Image Height (pixels) values in the histogram. It will be appreciated that a different method of converting from transform output values to the histogram can be used. Also, it will be appreciated that a different number of histogram bins can be used.

In some implementations, at each pixel, system 102 may sum the absolute values of horizontal, vertical, and diagonal filtering results. The result is a mask that is x-times smaller (e.g., 4 times smaller) than the original image.

In some implementations, in order to emphasize and protect the face regions, system 102 may multiply the pixels inside the detected face regions by a predetermined multiple (e.g., 5, etc.) to increase their values.

In some implementations, system 102 clusters the mask into shapes of interest. System 102 may apply a threshold to mask values using a predetermined threshold value (e.g., a threshold value of 32). In some implementations, after such thresholding, system 102 may obtain a binary mask (e.g., consisting of values 0, 1), where pixels marked with 1 correspond to "important" features.

In some implementations, system 102 may run a variant of a flood-fill algorithm on the binary mask. In various implementations, system 102 may execute an algorithm, which may operate as follows. Starting from each pixel with a value of 1, system 102 traverses its non-zero neighboring pixels and consider them part of the same shape as the original pixel. System 102 may perform the traversal recursively using a depth-first search algorithm. In some implementations, when the search goes from non-zero pixels to zero pixels, the search does not immediately stop. The search processes a few more pixels on the path, such that clusters very close to each other are treated as one.

In block 206, system 102 groups the one or more image features into one or more regions of interest. In various implementations, a region of interest may include one or more image features. In various implementations, an image feature may be an element or object in the image. For example, the objects may be the face of a person, a monument, a tree, etc. Implementations of regions of interest are described in more detail below.

Figure 4:
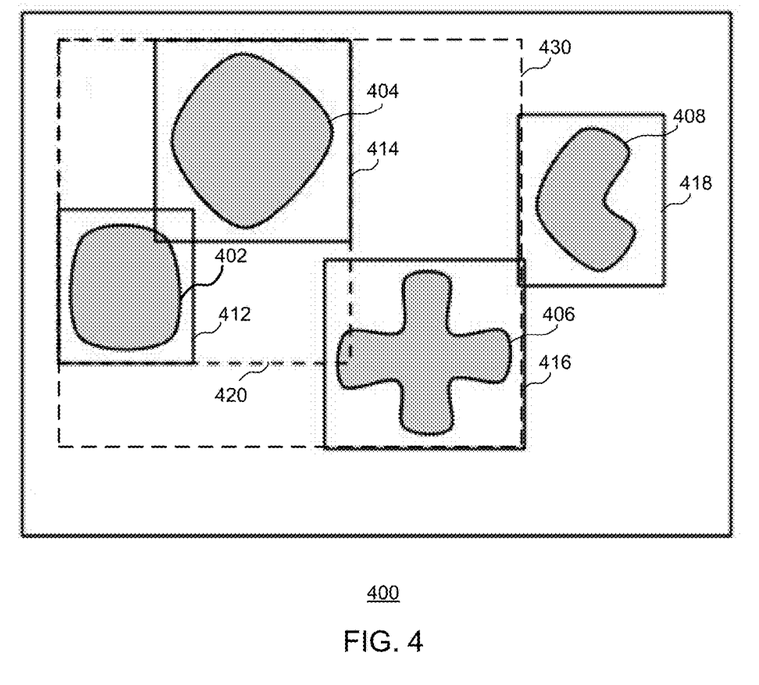
FIG. 4 illustrates an example image that contains regions of interest, according to some implementations.

FIG. 4 illustrates an example image 400 that contains regions of interest, according to some implementations. As shown, image 400 includes image features 402, 404, 406, and 408. In various implementations, system 102 determines a region of interest for each image feature. For example, a region of interest 412 includes image feature 402, a region of interest 414 includes image feature 404, a region of interest 416 includes image feature 406, and a region of interest 418 includes image feature 408.

In various implementations, for each region of interest, system 102 determines the smallest region that contains all of the pixels of a given image feature. For example, region of interest 412 contains all of the pixels of image feature 402, region of interest 414 contains all of the pixels of image feature 404, region of interest 416 contains all of the pixels of image feature 406, and region of interest 418 contains all of the pixels of image feature 408.

In some implementations, a determination of the smallest region may include system 102 determining the left-most, top-most, bottom-most, and right-most pixels of an image feature, where the region of interest encompasses these pixels. For ease of illustration, in FIG. 4, each region of interest (e.g., region of interest 412) is shown with a sufficiently large space between the border of the respective image feature (e.g., image feature 402) in order to illustrate that the region of interest contains all of the pixels of the image feature. The actual closest distance between a given part of the border of the respective image feature and the contained image feature may vary and will depend on the specific implementation. As shown, the regions of interest are rectangles. At the end of the step of determining the smallest region that contains all of the pixels of a given image feature, system 102 obtains a number of rectangles where each rectangular region corresponds to connected pixels of an image feature.

In various implementations, system 102 processes regions of interest by merging regions of interest to form larger regions of interest. As described in more detail below, in various implementations, system 102 merges one or more regions of interest based on one or more predetermined merging criteria.

In some implementations, system 102 creates a margin around one or more image features. For example, in some implementations, system 102 may enlarge a given region of interest with corresponding shapes containing more than a predetermined number pixels (e.g., 3 pixels) by the predetermined number of pixels (e.g., 3 pixels) in each direction.

In some implementations, system 102 constructs regions of interest such that image features or objects contained within a given region of interest are whole. System 102 constructs regions of interest such that no image feature or object is split into portions (e.g., split in half, etc.). In other words, system 102 constructs regions of interest such that the border of a given region of interest does not intersect any image feature border. For example, system 102 analyzes the border of each region of interest (e.g., regions of interest 412 and 414). If the border of one region of interest 412 intersects an image feature (e.g., border of region of interest 414 intersecting image feature 402), system 102 merges the two respective regions of interest 412 and 414 into a single region of interest 420, combining both.

As shown in FIG. 4, region of interest 414 for image feature 404 intersects image feature 402, but does not intersect image feature 406, so nothing is changed with respect to regions of interest 412 and 416.

In some implementations, region of interest 414 for image feature 404 intersects image feature 402, so the region of interest is made larger to contain both image features 402 and 404. As such, the resulting region of interest is denoted as region of interest 420 on image 400.

System 102 then analyzes region of interest 420 to see if it intersects other image features (e.g., image feature 406). In this particular example, region of interest 420 intersects image feature 406. System 102 may increase the size of a given region of interest (e.g., region of interest 420) such that it contains more image features (e.g., three image features 402, 404, and 406) in order to prevent a give image feature (e.g., image feature 406) from being split or otherwise intersected. For example, system 102 may enlarge region of interest 420 and/or create interest 430 to be sufficiently large such that it contains image features 402, 404, and 406.

Region of interest 416 and region of interest 418 do not intersect any image features. As such, system 102 does not change either region of interest 416 or region of interest 418.

In various implementations, each region of interest is a rectangle. Rectangles are typical shapes for photos. If a given user selects a given image feature or more, the regions of interest that contain those selected objects will already be shaped as a photo. Implementations directed to user selection of regions of interest are described in more detail below. While implementations are described herein in the context of rectangles, these implementations and others also apply to other shapes.

In various implementations, system 102 provides the regions of interest to a user. For example, system 102 may display regions of interest 420, 416, and 418 to the user. System 102 may then enable the user to select one or more regions of interest.

In various implementations, system 102 then provides the image to the user based on the selected regions of interest. For example, if the user selects region of interest 420, image 400 would include image features 402 and 404 and not include image features 406 and 408. In some implementations, system 102 may ultimately provide two or more finished cropped photos by separating the image into multiple images, where each separated image includes a different user-selected region of interest. In various implementations, the different user-selected regions of are interest are non-intersecting regions of interest. This could be a scenario where a given image has multiple image features of interest (e.g., a person in one portion of the photo and a monument in another portion of the image). The user might want one modified/cropped photo that shows only the person, and the user might want another modified or cropped/cropped photo that shows only the monument. In some implementations, system 102 may construct regions of interest so as to separate image features that are faces from non-facial image features (e.g., image features that are monuments, etc.). In some implementations, system 102 may construct regions of interest so as to separate different image features that are different faces.

In various implementations, system 102 may still keep or maintain the smaller regions of interest as a part of larger regions of interests. In FIG. 4, for example, shows six regions of interest, which may remain. Region of interest 412 contains image feature 402. Region of interest 414 contains image feature 404. Region of interest 420 contains image features 402 and 404. Region of interest 416 contains image feature 406. Region of interest 430 contains image features 402, 404, and 406. Region of interest 418 contains image feature 408. In some implementations, system 102 scales rectangle coordinates to describe coordinates in full size image, not a small mask. In some implementations, system 102 may add an additional region of interest containing the entire image 400.

In some implementations, system 102 may filter and/or construct regions of interest such that only regions of interest containing image features of at least a predetermined size exist or are kept. For example, regions of interest corresponding to image features of less than a predetermined number of pixels (e.g., four pixels) are ignored, filtered, or never created/constructed. In another example implementation, all regions of interest with a width that is less than or equal to the image width divided by a predetermined value are ignored or filtered (e.g., region of interest width <=image width/15). In another example implementation, all regions of interest with a height that is less than or equal to the image height divided by a predetermined number are ignored or filtered (e.g., regions of interest height <=image height/15). In another example implementation, a regions of interest with a width that is less than or equal to the image width divided by a predetermined number AND with a height that is less than or equal to the image height that is less than or equal to the image height divided by the predetermined number are ignored or filtered (e.g., region of interest width <=image width/5 AND region of interest height <=image height/5). As such, at least one dimension remains large.

In some implementations, similar rectangles are identified and copies of such rectangles are removed. If two rectangles have their borders within 1% of the image size, they may be considered similar. Processing all rectangle pairs this way, system 102 forms similarity sets and keeps only the largest region of interest out of each similarity set.

In some implementations, as indicated above, if system 102 detects one or more faces in an image, where some regions of interest contain faces and some regions of interest do not contain faces, system 102 may remove regions of interest that do not contain faces. This ensures that with an image with one or more faces, the focus is on the faces rather than on the background.

In various implementations, system 102 may perform additional processing on the final region of interest. Such processing may include but is not limited to the following.

In some implementations, system 102 may determine an importance score for each image feature based on predetermined factors. Such predetermined factors may include one or more of a location associated with the image feature, size of the image feature, 3-dimenstional (3D) orientation of the image feature, face recognition, etc. For example, in some implementations, system 102 may assign higher importance scores to faces than to non-faces. In some implementations, system 102 may assign a higher importance scores to a face positioned in the center of the original image than to other faces (e.g., other faces surrounding the centrally positioned face). In some implementations, system 102 may assign higher importance scores to larger faces than to smaller faces. In some implementations, system 102 may assign higher importance scores to single faces than to clusters of faces. In some implementations, system 102 may assign higher importance scores to monuments and/or recognized image features than to non-recognized image features. Based on this importance score, system 102 may filter regions of interest with less important image features in order to provide regions of interest with more important image features that would be most valued by the user. For example, system 102 may select a particular region of interest containing the image feature or face with the highest importance score, or a particular region of interest containing the largest face, or a particular region of interest containing all faces, etc. In some implementations, system 102 may construct various regions of interest such at these and enable a user to select one of these regions of interest.

In some implementations, system 102 may merge some regions of interest to create an entirely new region of interest, or to replace existing merged regions of interest. For example, if system 102 detects two non-overlapping regions of interest with the same or substantially the same semantic content, system 102 may merge the regions of interest together into one region of interest. In another example implementation, where an image contains multiple faces (e.g., 5 faces in a group photo), system 102 may separate each of the faces into separate regions of interest. In some implementations, system 102 may create and add a newly created region of interest by joining the separate regions of interests together.

The following includes additional implementations directed to detection of regions of interest. In some implementations, system 102 may detect faces in the resized image instead of or in addition to the full size image. In various implementations, system 102 may resize, crop, or resize and crop in order to provide an optimal composition.

In some implementations, system 102 may apply a Haar algorithm per channel, where the channels are not in an RGB color space, or system 102 may convert an image to a single channel color space (e.g., grayscale) before doing computations (or even before resizing image). In some implementations, system 102 may utilize different wavelet transforms or compute a different number of levels of Haar transform. In some implementations, system 102 may utilize different functions for combining multiple different Haar segments (e.g., three segments) into a single mask. In some implementations, system 102 may utilize different ways of enhancing faces in the mask. In some implementations, system 102 may utilize different thresholds for considering mask values of containing features.

In some implementations, system 102 may utilize different algorithms for clustering mask values into shapes, and may use different search strategies (e.g., breadth-first search). Modification to find very close shapes can be skipped or used with different factors.

In some implementations, system 102 may utilize different margins of making rectangles larger, or may skip such a step or move it to later step (e.g., to be added in full size image processing). An advantage of this would be that system 102 may ensure that margins do not contain any additional parts of shapes. In some implementations, system 102 may remove partial image features from a given region of interest. For example, referring to again to FIG. 4, region of interest 420 contains a portion of image feature 406. A user may select region of interest 420 for a photo, where region of interest 420 is to be cropped from image 400 in order to provide the photo. System 102 may remove the portion of image feature 406 in order to provide region of interest 420 without that portion of image feature 406 to the user. As such, resulting photo/region of interest 420 would contain only image features 402 and 404.

In some implementations, system 102 may skip steps of searching image features intersected by the regions of interest in order to make regions of interest larger and contain many image features at once.

In some implementations, system 102 may utilize different minimal size requirements for regions of interest or have additional requirements (e.g., for aspect ratio of the regions). In some implementations, system 102 may remove similar copies of regions of interest. In some implementations, system 102 may skip a phase of removing rectangles not containing faces. In some implementations, system 102 may utilize additional information similar to detected face bounding boxes in order to emphasize mask portions and/or ignore regions not containing a face.

Implementations described herein may also be applied to video. Implementations may crop the video following a given image feature or object. Implementations may apply filters emphasizing a moving image feature or object in a video. In some implementations, system 102 may separate a video into separated frames. System 102 may select some or all frames for further processing according to implementations described herein. For example, system 102 may select one frame for further processing per every N frames of input video (e.g., every 25 frames).

In some implementations, system 102 may identify regions of interest for each frame separately. In some implementations, system 102 may connect corresponding regions of interest in different frames with each other based on similar dimensions and position. In a case where it is difficult to determine connections, system 102 may analyze additional frames to better approximate moving regions of interest.

In some implementations, system 102 may apply one or more filters that emphasize a given region of interest (e.g., a vignette).

Implementations described herein provide various benefits. Implementations described herein provide photos with good composition. For example, implementations facilitate properly centering of regions of main interest. If the photo contains two or more subjects, implementations enable a particular subject to be easy to focus on. Implementations remove unwanted objects from photos (e.g., objects around the boundaries of the image).

As described in various implementations herein, system 102 provides photos with good composition by accurately determining regions of main importance, and then cropping the image in order to shift the focus to a desired region of interest. Also, as indicated herein, in addition to cropping, system 102 determines these regions to enable one or more particular filters (e.g., vignette filter) to emphasize the important content in the photo while suppressing other regions.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Figure 5:
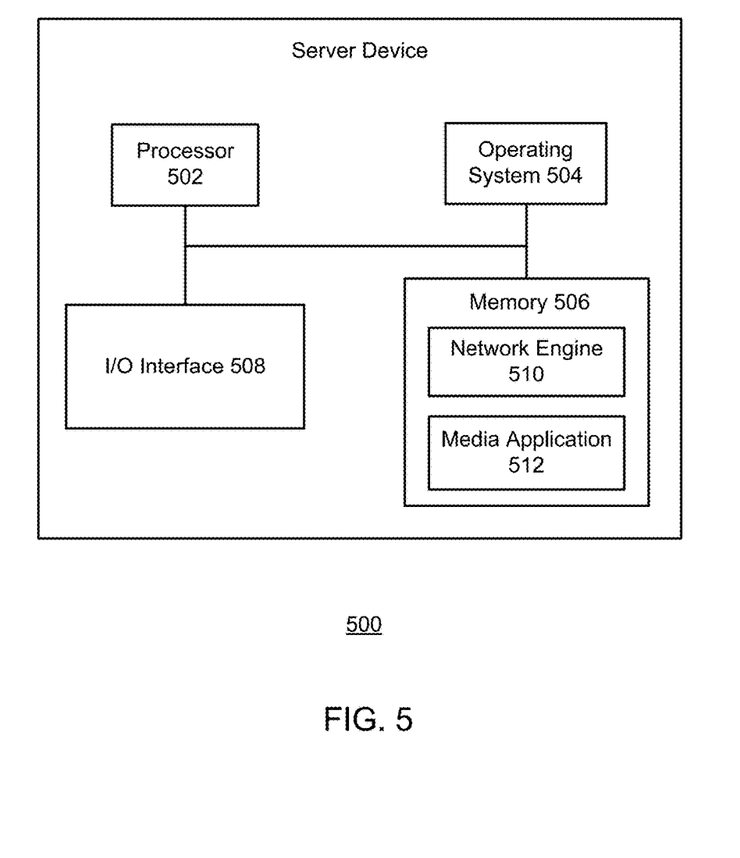
FIG. 5 illustrates a block diagram of an example server device, which may be used to implement the implementations described herein.

FIG. 5 illustrates a block diagram of an example server device 500, which may be used to implement the implementations described herein. For example, server device 500 may be used to implement server device 104 of FIG. 1, as well as to perform the method implementations described herein. In some implementations, server device 500 includes a processor 502, an operating system 504, a memory 506, and an input/output (I/O) interface 508. Server device 500 also includes a network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, network engine 510, and media application 512. These blocks 502, 504, 506, 508, 510, and 512 may represent multiple processors, operating systems, memories, I/O interfaces, network engines, and media applications. In other implementations, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

What is claimed is:

1. A computer-implemented method comprising:
receiving an image;
determining two or more image features in the image, wherein the two or more image features include one or more faces and one or more non-facial image features;
grouping the two or more image features into one or more regions that separate the one or more faces from the one or more non-facial image features such that each feature of the two or more image features is located in one of the one or more regions, wherein the grouping includes:
   determining a respective initial region for each image feature of the two or more image features, wherein the respective initial region includes all pixels of the image feature;
   determining that at least a first initial region border intersects a second image feature border within a second initial region; and
   in response to determining that the first initial region border and the second image feature border intersect, determining a merged region within a single image that includes a first portion having a first image feature of the first initial region and a second portion having a second image feature of the second initial region, wherein the first image feature corresponds to different pixels from pixels of the second image feature;
providing a user interface on a display screen, wherein the user interface includes the image and enables a user to select at least one region of interest that includes at least one of the one or more faces from the one or more regions; and
in response to user selection of the at least one region of interest, providing a modified image that includes corresponding pixels for the at least one region of interest with the at least one of the one or more faces and excludes other regions of the one or more regions with the one or more non-facial image features.

2. The method of claim 1, wherein the determining of the two or more image features comprises detecting the one or more faces.

3. The method of claim 1, further comprising modifying the image based on the at least one region of interest from the one or more regions, wherein the modifying includes at least one of:
   multiplying each pixel of the at least one region of interest by a predetermined multiple;
   cropping the image based on the at least one region of interest; and
   applying one or more filters to the image based on the at least one region of interest.

4. The method of claim 1, wherein determining the two or more image features in the image further comprises:
   separating, using a Haar wavelet transform, the image into three boxes, wherein the boxes respectively comprise values corresponding to a vertical, a horizontal and a diagonal direction of the transform; and
   generating a histogram based on the values.

5. A non-transitory computer-readable storage medium carrying program instructions thereon, the instructions when executed by one or more processors cause the one or more processors to perform operations comprising:
receiving an image;
determining two or more image features in the image, wherein the two or more image features include one or more faces and one or more non-facial image features;
grouping the two or more image features into one or more regions that separate the one or more faces from the one or more non-facial image features such that each feature of the two or more image features is located in one of the one or more regions, wherein the grouping includes:
   determining a respective initial region for each image feature of the two or more image features, wherein the respective initial region includes all pixels of the image feature; and
   merging at least two of the initial regions based on one or more predetermined merging criteria to generate a merged region within a single image containing a portion of each of the at least two initial regions, wherein the merged region contains the two or more image features, and wherein the one or more predetermined merging criteria include determining that a first initial region border intersects a second image feature border within a second initial region;
providing a user interface on a display screen, wherein the user interface includes the image and enables user input to select at least one of the one or more regions that includes at least one of the one or more faces; and
causing a modified image to be displayed based on the at least one selected region, wherein the modified image includes corresponding pixels for the at least one selected region with the at least one of the one or more faces and no other regions of the one or more regions.

6. The computer-readable medium of claim 5, wherein merging the initial regions based on one or more predetermined merging criteria comprises:
analyzing borders of the initial regions to determine the at least two initial regions, wherein a border of each of the at least two initial regions intersects a border of at least one other region of the at least two initial regions.

7. The computer-readable medium of claim 5, wherein the instructions cause the one or more processors to perform further operations comprising:
modifying the image based on the at least one selected region from the one or more regions, wherein the modifying includes at least one of:
multiplying each pixel of the at least one selected region by a predetermined multiple;
cropping the image based on the at least one selected region; and
applying one or more filters to the image based on the at least one selected region.

8. The computer-readable medium of claim 5, wherein, to determine the two or more image features, the instructions further cause the one or more processors to perform operations comprising using a transform to generate an indication of content in the image.

9. The computer-readable medium of claim 5, wherein the instructions further cause the one or more processors to perform operations comprising enlarging a boundary of at least one of the initial regions to include at least one additional image feature of the two or more image features based on an intersection of the at least one initial region with the at least one additional image feature.

10. The computer-readable medium of claim 5, wherein merging the initial regions based on one or more predetermined merging criteria comprises:
detecting that the at least two initial regions are non-overlapping regions with same semantic content.

11. The computer-readable medium of claim 10 wherein the one or more predetermined merging criteria include an intersection of a plurality of the one or more regions.

12. The computer-readable medium of claim 5, wherein the instructions further cause the one or more processors to perform operations comprising:
separating the image into multiple images, where each separated image includes a different one of the one or more regions based on the at least one selected region.

13. A system comprising:
one or more processors; and
logic encoded in one or more tangible media for execution by the one or more processors and when executed operable to perform operations comprising:
receiving a single image;
determining one or more image features in the single image;
grouping the one or more image features into one or more regions within the single image such that each region includes a plurality of pixels of the single image;
determining that a border of a first region of the one or more regions intersects a border of a particular image feature of the one or more image features;
merging the first region with a second region of the one or more regions that includes the particular image feature to generate a merged region within the single image, such that the merged region includes each pixel of the first region and each pixel of the second region such that the merged region includes the particular image feature as a whole;
selecting at least one of the one or more regions that satisfies one or more predetermined criteria;
determining an importance score for each image feature based on one or more predetermined factors;
modifying the single image to include corresponding pixels for the at least one of the one or more regions based on the importance scores, wherein the modifying comprises at least one of:
cropping the single image based on the at least one of the one or more regions such that regions that are not selected are excluded; and
applying one or more filters to the single image that emphasize the at least one of the one or more regions, wherein applying the one or more filters comprises multiplying pixels inside the at least one of the one or more regions by a predetermined multiple to increase values of the pixels; and
providing the modified single image in a user interface on a display screen.

14. The system of claim 13, wherein the logic when executed is further operable to perform operations comprising enlarging the at least one of the one or more regions based on the at least one region intersecting at least one of the image features wherein enlarging the at least one of the one or more regions does not change pixel values of the image.

15. The system of claim 13, wherein the logic when executed is operable to perform the modifying of the single image including filtering at least one of the one or more regions from the single image based on the importance scores, the operations further comprising providing one or more unfiltered regions of the one or more regions for display.

16. The system of claim 13, where grouping the one or more image features into one or more regions comprises:
determining a respective initial region for each image feature, wherein the respective initial region includes all pixels of the image feature; and
merging at least two of the initial regions based on one or more predetermined merging criteria.

17. The system of claim 13, wherein determining the one or more image features comprises:
computing a wavelet transform for the single image; and
using to transform to generate an indication of content in the single image.

18. The system of claim 13, wherein determining the one or more image features comprises:
separating, using a Haar wavelet transform, the single image into three boxes, wherein the boxes respectively comprise values corresponding to a vertical, a horizontal and a diagonal direction of the transform; and
generating a histogram based on the values, wherein the histogram provides an indication of content in the single image.

19. The method of claim 1, wherein determining the two or more image features in the image further comprises:
computing a wavelet transform for the image; and
using the transform to generate an indication of content in the image.

20. The method of claim 19, wherein the indication of content indicates the one or more faces in the image, the method further comprising multiplying pixels of at least one of the one or more regions in the image by a predetermined multiple to increase pixel values in the at least one of the one or more regions.

* * * * *